March 7, 1939.  J. H. OWEN  2,149,624
BRAKING DEVICE
Filed March 28, 1938

INVENTOR
J. H. Owen
BY
ATTORNEY

Patented Mar. 7, 1939

2,149,624

UNITED STATES PATENT OFFICE 2,149,624

BRAKING DEVICE

John H. Owen, Folsom City, Calif.

Application March 28, 1938, Serial No. 198,372

2 Claims. (Cl. 188—142)

This invention relates generally to a vehicle braking device and in particular is directed to a braking device for trailers.

With the construction of modern highways both trucks and automobiles frequently are used in connection with trailers. The use of trailers has presented a problem in that the momentum of the trailer places an excessive strain on the brakes of the truck or automobile when said brakes are applied and especially on down grades. The problem has been solved to a certain extent by equipping the wheels of the trailers with brakes but this requires a complicated and expensive brake control mechanism extending from the trailer to the driver's compartment in the truck or automobile.

It is therefore the principal object of my invention to provide an automatic brake applying mechanism for trailers, the mechanism being arranged to function under the influence of the momentum of the trailer when the trailer momentum exceeds that of the draft vehicle, as when the brakes are applied on the latter.

Another object of my invention is to provide a mechanism of the character as above including means to equalize the braking force applied to the trailer wheel brakes.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
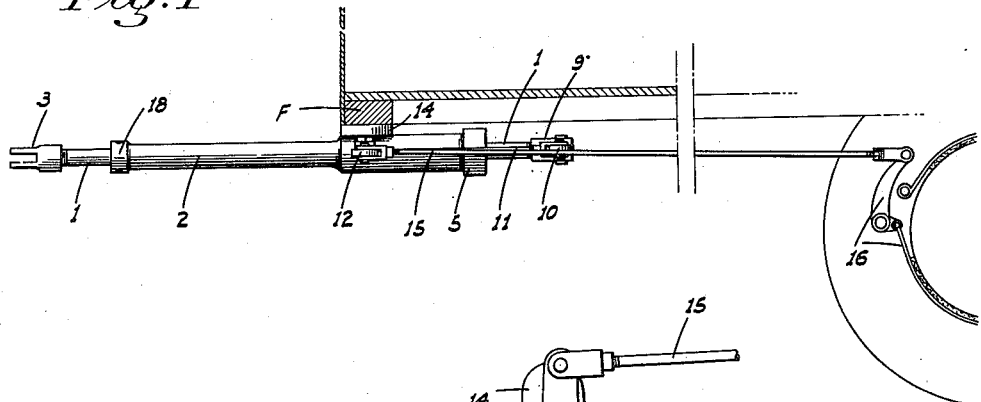
Figure 1 is a side elevation of the device mounted in connection with a trailer.
Figure 2:
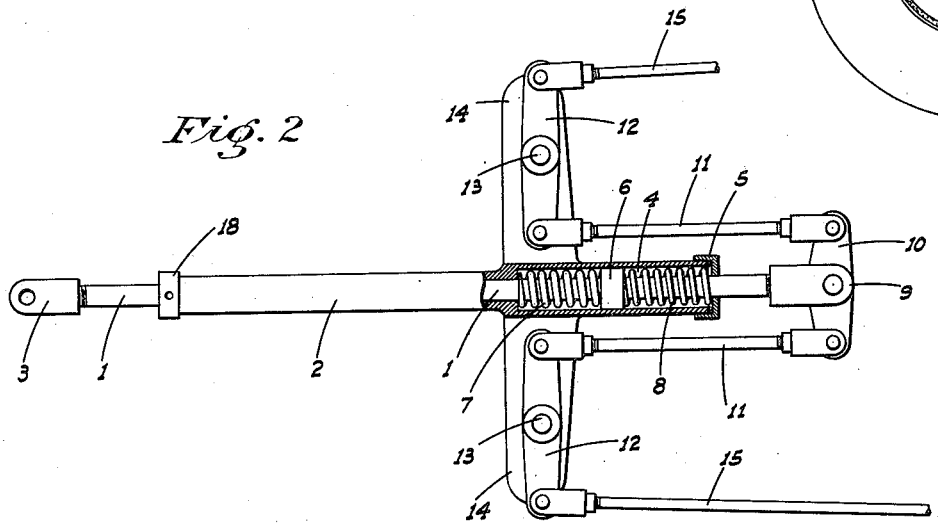
Figure 2 is a bottom plan view of the device in inoperative position, and with a portion thereof shown in section.
Figure 3:
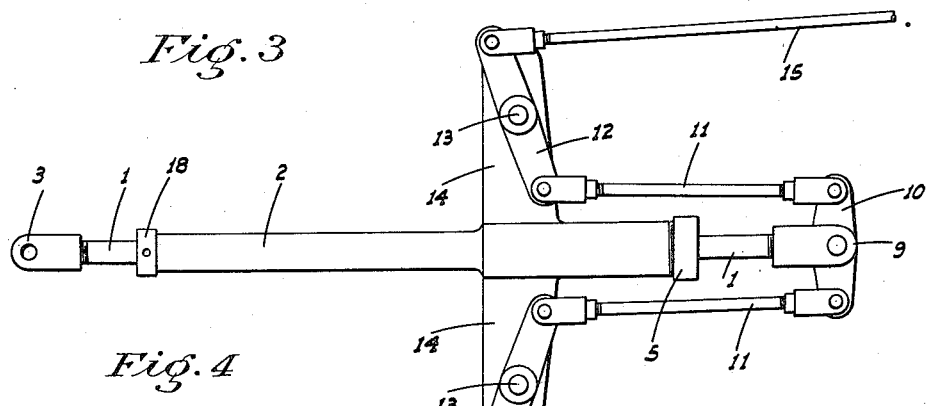
Figure 3 is a bottom plan view of the device in operative or brake actuating position.

Referring now more particularly to the characters of reference on the drawing, the numeral 1 indicates a tongue or draw bar which is preferably circular in section and slidably extends through the bore of a heavy duty sleeve 2. The forward end of the draw bar is provided with a clevis 3 or other connecting member of the usual type.

The rear end portion of the sleeve as well as the bore therein is enlarged, as at 4, and the open end of such enlarged portion is provided with a cap 5 threaded thereon. The draw bar slidably projects through an opening in such cap. A collar 6 is secured on the draw bar intermediate the ends of the enlarged bore 4 and is slidably disposed therein.

A compression spring 7 is disposed about the bar between the collar 6 and inner or forward end of the enlarged sleeve portion, while another compression spring 8 is disposed about the bar between the collar 6 and cap 5.

A clevis 9 is mounted on the inner end of bar 1 and an equalizing lever 10 is pivoted centrally of its ends in connection with the clevis, the lever 10 being horizontally disposed for swinging movement in such plane.

Clevis attached connecting rods 11 extend from pivotal connection with the outer ends of lever 10 forward to connection with the adjacent ends of laterally extending, horizontal direction changing levers 12. These levers are centrally pivoted, as at 13, on wing plates 14 which project laterally and horizontally from sleeve 2 in opposite directions.

In use, the above described unit is mounted on the underside of the trailer frame F at the front and with the draw bar 1 and forward portion of the sleeve projecting ahead of the trailer. The forward ends of brake rods 15, of usual type, are clevis connected to the opposite or outermost ends of direction changing levers 12, while the rear ends of the rods are connected with the trailer wheel brake assemblies 16 which also are of usual construction.

When the trailer is connected by clevis 3 with an automobile or truck, the brake applying device, as described above, functions in the following manner:

As long as the momentum of the trailer is less than that of the towing vehicle, the trailer brakes are unaffected. However, when the trailer momentum is greater (as when the brakes on the draft vehicle are applied) such momentum will cause bar 1 to slide rearwardly in sleeve 2 and against the compression of spring 8. This moves equalizing lever 10 and rods 11 rearwardly resulting in swinging of levers 12 and forward movement of rods 15 and application of the trailer brakes 16. The compression of spring 8 is predetermined according to the trailer weight, and is of sufficient compressive strength to permit only the proper degree of brake application. Adjustment of the compression of spring 8 can be accomplished through cap 5. Spring 7 is a counter-balancing and shock absorbing spring.

Due to the arrangement of the device, application of the trailer brakes will occur in proper degree relative to the braking or loss of momentum of the draft vehicle.

Figure 4:
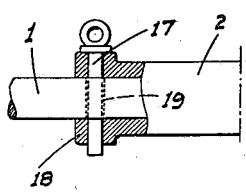
Figure 4 is a large scale detail.

When it is desired to back up the draft vehicle and trailer, a pin 17 is passed through a radial opening in an enlarged collar-like head 18 on the forward end of sleeve 2, and through a registering hole 19 in bar 1 (see Fig. 4).

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. Actuating means for the wheel brakes of a trailer comprising a relatively long sleeve adapted to extend lengthwise of the trailer, a drawbar slidably extending through the sleeve, means yieldably resisting rearward movement of the bar in the sleeve, a transverse equalizing lever pivoted on the rear end of the bar, a pair of laterally extending direction changing levers disposed ahead of the rear end of the sleeve on opposite sides thereof, said lateral levers at one end being connected to the ends of the equalizing lever, brake actuating rods connected to the other end of the lateral levers, and means pivotally mounting said lateral levers in unitary connection with the sleeve and comprising a laterally extending mounting plate rigid with the sleeve on top of the same and adapted to engage and be secured against the underside of a frame member of the trailer.

2. Actuating means for the wheel brakes of a trailer comprising a relatively long sleeve adapted to extend lengthwise of the trailer, a drawbar slidably extending through the sleeve, means yieldably resisting rearward movement of the bar in the sleeve, a laterally extending direction changing lever disposed ahead of the rear end of the sleeve on one side thereof, a connection between the rear end of the drawbar and one end of the lever to swing the latter with rearward movement of the drawbar in the sleeve, a brake applying element connected to and extending from said lever, a laterally extending mounting plate rigid with the sleeve and overhanging said lever, and means pivoting the lever on said plate; the top of the plate being above the top of the sleeve and being adapted to abut and be secured against the underside of a frame member of the trailer.

JOHN H. OWEN.